United States Patent
Sun et al.

(10) Patent No.: US 11,507,888 B2
(45) Date of Patent: Nov. 22, 2022

(54) TRAINING METHOD AND DEVICE FOR MACHINE TRANSLATION MODEL AND STORAGE MEDIUM

(71) Applicant: Beijing Xiaomi Intelligent Technology Co., Ltd., Beijing (CN)

(72) Inventors: Yuhui Sun, Beijing (CN); Xiang Li, Beijing (CN); Jingwei Li, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 461 days.

(21) Appl. No.: 16/840,054

(22) Filed: Apr. 3, 2020

(65) Prior Publication Data

US 2021/0182733 A1 Jun. 17, 2021

(30) Foreign Application Priority Data

Dec. 13, 2019 (CN) .......................... 201911281744.4

(51) Int. Cl.
*G06N 20/00* (2019.01)
*G06F 40/58* (2020.01)

(52) U.S. Cl.
CPC ............. *G06N 20/00* (2019.01); *G06F 40/58* (2020.01)

(58) Field of Classification Search
CPC ..................................................... G06F 40/58
See application file for complete search history.

(56) References Cited

U.S. PATENT DOCUMENTS

| 10,437,933 B1 | 10/2019 | Clifton et al. |
| 2014/0200878 A1 | 7/2014 | Mylonakis et al. |
| 2019/0197012 A1 | 6/2019 | Ardhanari et al. |

(Continued)

FOREIGN PATENT DOCUMENTS

| JP | 2009064051 A | 3/2009 |
| KR | 20190073525 A | 6/2019 |

OTHER PUBLICATIONS

Hinton, G. et al., *Distilling the Knowledge in a Neural Network*, Mar. 9, 2015, pp. 1-9.

(Continued)

*Primary Examiner* — James J Debrow
(74) *Attorney, Agent, or Firm* — Finnegan, Henderson, Farabow, Garrett & Dunner, L.L.P.

(57) ABSTRACT

A training method for a machine translation model, includes: obtaining a multi-domain mixed training data set; performing data domain classification on a plurality of training data pairs in the training data set to obtain at least two domain data subsets; based on each domain data subset, determining at least two candidate optimization targets for the domain data subset, and training at least two candidate single domain models corresponding to each domain data subset based on the at least two candidate optimization targets, respectively; testing the at least two candidate single domain models corresponding to each domain data subset separately, and selecting a candidate optimization target with a highest test accuracy as a designated optimization target for the domain data subset; and training a hybrid domain model based on each domain data subset in the training data set and the designated optimization target corresponding to each domain data subset.

11 Claims, 5 Drawing Sheets

(56) References Cited

U.S. PATENT DOCUMENTS

2019/0325308 A1    10/2019   Chung et al.
2020/0073889 A1*   3/2020    Sakamoto ............. G06F 16/901

OTHER PUBLICATIONS

Grant of Patent for Korean Patent Application No. 10-2020-0010849, dated Nov. 23, 2021.
Lee, Jin-su, et al., "Model Ensemble for Speed Enhancement in Object Detection", Journal of The Institute of Electronics and Information Engineers, vol. 56, No. 6, Jun. 2019, 9 pages.
Office Action issued in Korean Application No. 10-2020-0010849, dated May 25, 2021, 7 pages.
Extended European Search Report in the European Application No. 20174656.7, dated Oct. 22, 2020.
Sun, Y., et al., Xiaomi's Submissions for IWSLT 2020 Open Domain Translation Task, Proceedings of the $17^{th}$ International Conference on Spoken Language Translation (IWSLT), Jul. 9-10, 2020, pp. 149-157.
Office Action issued in Japanese Application No. 2020-055522, dated May 12, 2021, 6 pages.
Office Action issued in Korean Application No. 10-2020-0010849, dated Jul. 25, 2021, 7 pages.
Chu, C. et al., Multilingual Multi-Domain Adaptation Approaches for Neural Machine Translation, arXiv:1906.07978v2 [cs.CL], Jun. 20, 2019, 9 pages.

* cited by examiner

TRAINING METHOD AND DEVICE FOR MACHINE TRANSLATION MODEL AND STORAGE MEDIUM

CROSS-REFERENCE TO RELATED APPLICATION

This application is based upon and claims priority to Chinese Patent Application No. 201911281744.4, filed on Dec. 13, 2019, the entire content of which is incorporated herein by reference.

TECHNICAL FIELD

Embodiments of the present disclosure generally relate to natural language processing technologies, and more particularly, to a training method and device for a machine translation model, and a storage medium.

BACKGROUND

In the field of machine translation, in order to increase the accuracy of language translation, training methods of machine translation have been continuously improved.

In related arts, mixed language data from multiple data domains are trained to obtain a universal translation model that is suitable for multi-domain translation and has a good translation effect in each domain.

For the language data in different domains, due to a difference in the amount of language data, the difficulties in training are inconsistent. In the related arts, the translation model obtained by mixing the language data in multiple data domains for training may cause inconsistent quality of language data translation results in different domains.

SUMMARY

According to a first aspect of embodiments of the present disclosure, a training method for a machine translation model, includes: obtaining a multi-domain mixed training data set, wherein the training data set includes a plurality of training data pairs, and each training data pair includes a source language sequence and a target language sequence having a same semantics; performing data domain classification on the plurality of training data pairs in the training data set to obtain at least two domain data subsets, wherein each domain data subset corresponds to one data domain; determining, based on each domain data subset, at least two candidate optimization targets for the domain data subset, and training at least two candidate single domain models corresponding to each domain data subset based on the at least two candidate optimization targets, respectively; for each domain data subset, testing the at least two candidate single domain models corresponding to the domain data subset separately, and selecting a candidate optimization target corresponding to one of the candidate single domain models with the highest test accuracy as a designated optimization target for the domain data subset; and training a hybrid domain model based on each domain data subset in the training data set and the designated optimization target corresponding to each domain data subset.

According to a second aspect of embodiments of the present disclosure, a training device for a machine translation model, includes: a processor; and a memory storing instructions executable by the processor, wherein the processor is configured to: obtain a multi-domain mixed training data set, wherein the training data set includes a plurality of training data pairs, and each training data pair includes a source language sequence and a target language sequence having a same semantics; perform data domain classification on the plurality of training data pairs in the training data set to obtain at least two domain data subsets, wherein each domain data subset corresponds to one data domain; based on each domain data subset, determine at least two candidate optimization targets for the domain data subset, and train at least two candidate single domain models corresponding to each domain data subset based on the at least two candidate optimization targets, respectively; for each domain data subset, test the at least two candidate single domain models corresponding to the domain data subset separately, and select a candidate optimization target corresponding to one of the candidate single domain models with the highest test accuracy as a designated optimization target for the domain data subset; and train a hybrid domain model based on each domain data subset in the training data set and the designated optimization target corresponding to each domain data subset.

According to a third aspect of embodiments of the present disclosure, a non-transitory computer-readable storage medium has stored therein instructions that, when executed by a processor of a computer device, cause the computer device to perform the training method for the machine translation model according to the first aspect.

The technical solutions according to embodiments of the present disclosure have the following advantageous effects:

A multi-domain mixed training data set is obtained, and data domain classification is performed on the plurality of training data pairs in the training data set to obtain at least two domain data subsets. Based on each domain data subset, at least two candidate optimization targets for the domain data subset are determined, and at least two candidate single domain models corresponding to each domain data subset are trained based on the at least two candidate optimization targets, respectively. For each domain data subset, the at least two candidate single domain models corresponding to the domain data subset are tested separately, and a candidate optimization target corresponding to one of the candidate single domain models with the highest test accuracy is selected as a designated optimization target for the domain data subset. A hybrid domain model is trained based on each domain data subset in the training data set and the designated optimization target corresponding to each domain data subset. In this way, different optimization targets are set for language data in different domains and training is performed to obtain machine translation models, which improves the quality of translation results of the machine translation models for language data in various domains.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
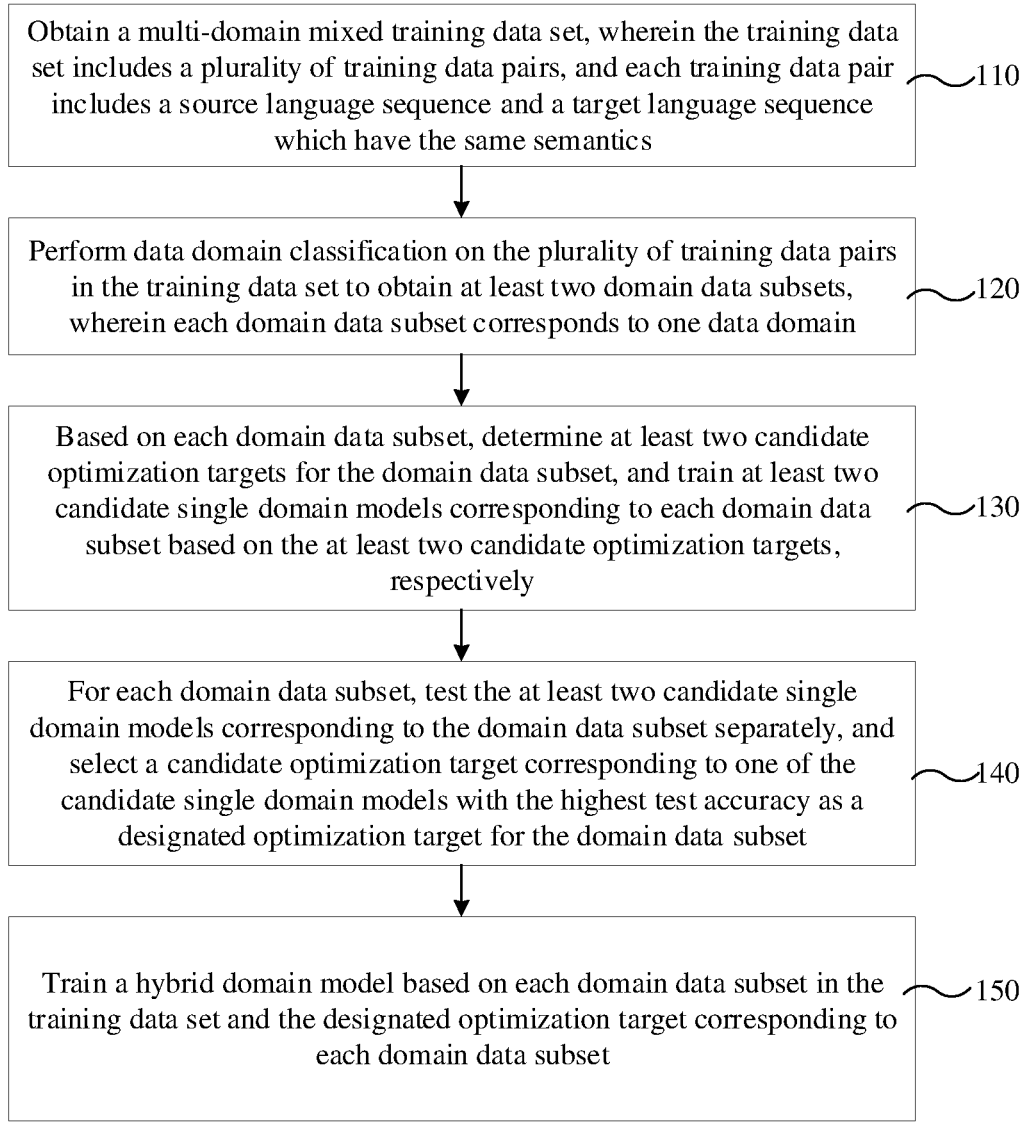
FIG. 1 shows a flowchart of a training method for a machine translation model according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Artificial intelligence is a theory, method, technology and application system that uses digital computers or machines controlled by digital computers to simulate, extend human intelligence, perceive environments, acquire knowledge and use knowledge to obtain best results. In other words, artificial intelligence is a comprehensive technology of computer science, which attempts to understand the essence of intelligence and produce a new kind of intelligent machine that can respond in a similar way to human intelligence. Artificial intelligence is to study design principles and implementation methods of various intelligent machines to make the machines have functions of perception, reasoning and decision-making.

The artificial intelligence technology is a comprehensive discipline, covering a wide range of domains, both at the hardware level and at the software level. Basic artificial intelligence technologies generally include technologies such as sensors, dedicated artificial intelligence chips, cloud computing, distributed storage, big data processing technologies, operation/interaction systems, and mechatronics. Artificial intelligence software technologies mainly include computer vision technologies, speech processing technologies, natural language processing technologies, and machine learning/deep learning.

Natural language processing is an important direction in the field of computer science and artificial intelligence. Natural language processing studies various theories and methods that enable effective communication between humans and computers using natural language. Natural language processing is a science that integrates linguistics, computer science, and mathematics. Therefore, researches in this area generally involve natural language, that is, the language that people use every day, and thus natural language processing is closely related to the study of linguistics. Natural language processing technologies usually include technologies such as text processing, semantic understanding, machine translation, robot question answering, and knowledge maps.

Knowledge distillation, also known as dark knowledge extraction, uses soft-targets associated with a teacher network which is complex but has superior inference performance, as a part of total loss to induce simple and low-complexity student network training to achieve knowledge transfer.

Knowledge transfer is the impact of one kind of learning on another kind of learning. In the continuous process of learning, any learning is based on the knowledge experience and cognitive structure, acquired motor skills, and the learned attitudes that the learner already has. That is, the connection between new and old knowledge is used to inspire students to compare new and old knowledge, think from old knowledge areas, understand new knowledge, and learn how to learn.

Machine translation, also known as automatic translation, is the process of using a computer to convert one natural language (source language) into another natural language (target language). Generally, machine translation refers to the translation of sentences and full text between natural languages. Machine translation is a branch of natural language processing, which has an inseparable relationship with computational linguistics and natural language understanding. Machine translation uses linguistic principles. Machines automatically recognize grammars, call the stored dictionary, and automatically perform corresponding translations. However, because of grammatical, lexical, and syntactic changes or irregularities, there may be inaccurate machine translations.

In related arts, when translation of language sequences in different domains is required, it is implemented by fine-tune. The process of a traditional fine-tune method may be as follows:

1) A model A is trained on in-domain data with a large amount of general language data, and performance on the in-domain data is good.

2) Then, the model A is fine-tuned with out-domain data with a small amount of general language data to obtain a model B.

3) The model B is obtained as a translation model for in-domain and out-domain. The model B performs well on both in-domain data and out-domain data.

However, there may be a problem in adjusting the translation model by using the fine-tune method. After the translation model is adapted to the out-domain data, the translation effect on the in-domain data may be significantly reduced. In addition, entity words may have different meanings in different domains. For example, the Chinese words "花王" means "King of Flowers" in the oral expression, but in the domain of cosmetics, the Chinese words "花王" means a cosmetic brand, and thus one word may correspond to different translation results. If the model A, which was originally trained on data in the domain of oral expression, is trained as model B through fine-tune, then for the model B, the translation of the Chinese words "花王" will be changed from "King of Flowers" to "KAO", Therefore, in order to solve the above problems, data from multiple domains need to be mixed together for training.

In the process of mixed training of domain data, amounts of linguistic data in different domains are different, and orders of language data in different domains are different, and consequently training difficulties in different domains are different. The resulted training model may perform better in domains with a large amount of linguistic data and simple word order, and perform poorly in domains with a small amount of linguistic data and difficult word order.

The present disclosure provides a method for training a machine translation model, which can set different optimization targets for language data in different domains to obtain a machine translation model, thereby improving the quality of the machine translation model's translation results for language data in various domains. The training method for the machine translation model according to embodiments of the present disclosure are described in detail below with reference to drawings.

FIG. 1 shows a flowchart of a training method for a machine translation model according to an exemplary embodiment of the present disclosure. The method can be executed by a computer device. As shown in FIG. 1, the training method for the machine translation model includes the following steps.

In step 110, a multi-domain mixed training data set is obtained. The training data set includes a plurality of training data pairs, and each training data pair includes a source language sequence and a target language sequence which have the same semantics.

In an embodiment, the multi-domain mixed training data set includes training data pairs in at least two domains, and there may be no clear domain boundary between the training data pairs in multiple domains. That is, in the training data set, each domain contains at least one training data pair, and training data pairs in different domains exist in a mixed manner, and each training data pair includes a source language sequence and a target language sequence with the same semantics.

In an embodiment, the target language sequence is a preset translation result of the source language sequence. For example, if the Chinese character "苹果" is translated into English "Apple", then "苹果" is the source language sequence and the corresponding "Apple" is the target language sequence.

In step 120, data domain classification is performed on the plurality of training data pairs in the training data set to obtain at least two domain data subsets, wherein each domain data subset corresponds to one data domain.

For the multi-domain mixed training data set, the training data pairs in the training data set may be classified according to different domains to obtain at least two domain data sets corresponding to different domains.

In an embodiment, a mark corresponding to each domain can be set on training data pairs in different domains. For example, for a training data set containing training data pairs in two data domains, e.g., data domain A and data domain B, a mark corresponding to the data domain A may be set on the training data pair belonging to the data domain A in the training data set, and a mark corresponding to the data domain B may be set on the training data pair that belonging to the data domain B in the training data set. Accordingly, during the machine translation model training process, domain classification may be performed on the training data pairs in the training data set according to the marks on the training data pairs belonging to different domains.

In step 130, based on each domain data subset, at least two candidate optimization targets for the domain data subset are determined, and at least two candidate single domain models corresponding to each domain data subset are trained based on the at least two candidate optimization targets, respectively.

In an embodiment, in the training procedure of the training data set, the training is performed on a domain data subset as a unit to determine candidate optimization targets corresponding to different domain data subsets. The optimization target refers to the standard for calculating the loss function for the prediction results output by the machine translation model during the machine translation. The parameters in the machine model are adjusted according to the calculation result of the loss function, so that the prediction results output by the machine translation model after the parameter adjustment are as close as possible to the optimization target, that is, the calculation result of the loss function is the smallest.

The loss function is used to describe the gap between the predicted value of the model and the optimization target. The smaller the value of the loss function, the more accurate the prediction result of the model is.

For each domain data subset, at least two candidate optimization targets can be determined to perform model training based on the training data pairs in the domain data subset, so as to obtain at least two candidate single domain models corresponding to the candidate optimization targets.

In an embodiment, the training of the at least two candidate single domain models corresponding to the domain data subset based on the at least two candidate optimization targets may be performed by using a neural machine translation framework transformer.

In step 140, for each domain data subset, the at least two candidate single domain models corresponding to the domain data subset are tested separately, and a candidate optimization target corresponding to one of the candidate single domain models with the highest test accuracy is selected as a designated optimization target for the domain data subset.

In an embodiment, after obtaining at least two candidate single domain models corresponding to each domain data subset, at least two candidate single domain models corresponding to each domain data subset may be tested. In the test, the same set of test data can be used to test at least two candidate single domain models corresponding to the same domain data subset. Based on the similarity between the output results of the candidate single domain models with respect to the test data and the target test results in the test data, the optimization target corresponding to a candidate single domain model which has the highest test accuracy is selected as the designated optimization target for the domain data subset. For example, the BLEU algorithm may be used to calculate the similarity between the output results of the candidate single domain models corresponding to a domain data subset with respect to the test data and the target test results in the test data. The value range of the final result of the BLEU algorithm is [0,100]. The higher the value of the final result, the higher the similarity will be, that is, the output result of the candidate single domain model is closer to the target test result in the test data, and accordingly, the candidate single domain model is considered to have a higher quality. Finally, the optimization target corresponding to a candidate single domain model with the highest BLEU value on the test set is obtained as the designated optimization target for the domain data subset.

In step 150, a hybrid domain model is trained based on each domain data subset in the training data set and the designated optimization target corresponding to each domain data subset.

In an embodiment, based on each domain data subset, determining at least two candidate optimization targets for the domain data subset, and training at least two candidate single domain models corresponding to each domain data subset based on the at least two candidate optimization targets, respectively, includes: based on each domain data subset, training a teacher model corresponding to each domain data subset; based on at least one of each target language sequence of the domain data subset and a prediction result of the teacher model corresponding to each domain data subset, determining the at least two candidate optimization targets for the domain data subset; and based on the at least two candidate optimization targets, training at least two student models corresponding to the domain data subset as the at least two candidate single domain models corresponding to the domain data subset.

In an embodiment, based on at least one of each target language sequence of the domain data subset and a prediction result of the teacher model corresponding to each domain data subset, determining the at least two candidate optimization targets for the domain data subset includes: for each domain data subset, constructing an optimization objective function: $pT(X)+(1-p)Y$, where $T(X)$ is a predicted probability distribution output by the teacher model corresponding to the domain data subset, Y is a true probability distribution of each target language sequence included in the domain data subset, and p is a domain weight and satisfies $0 \leq p \leq 1$; and selecting at least two values of the domain weight p, and obtaining the at least two candidate optimization targets for the domain data subset based on the optimization objective function.

In an embodiment, performing data domain classification on the plurality of training data pairs in the training data set to obtain at least two domain data subsets, includes: importing the plurality of training data pairs in the multi-domain mixed training data set into a data domain classification model to perform the data domain classification on the plurality of training data pairs, so as to obtain the at least two domain data subsets, wherein each domain data subset includes at least one training data pair.

In an embodiment, based on each domain data subset, training a teacher model corresponding to each domain data subset, includes: with a true probability distribution of each target language sequence included in each domain data subset as an optimization target, training the teacher model corresponding to the domain data subset.

In an embodiment, for each domain data subset, testing the at least two candidate single domain models corresponding to the domain data subset separately, and selecting a candidate optimization target corresponding to one of the candidate single domain models with the highest test accuracy as a designated optimization target for the domain data subset, includes: constructing a test data set corresponding to each domain data subset; testing accuracies of the at least two candidate single domain models corresponding to each domain data subset according to the test data set corresponding to each domain data subset; and selecting the candidate optimization target corresponding to one of the candidate single domain models with the highest test accuracy as the designated optimization target for the domain data subset.

In an embodiment, training a hybrid domain model based on each domain data subset in the training data set and the designated optimization target corresponding to each domain data subset, includes: inputting each domain data subset to the hybrid domain model, and training the hybrid domain model according to the designated optimization target corresponding to each domain data subset.

In the training methods for the machine translation model according to embodiments of the present disclosure, a multi-domain mixed training data set is obtained, and data domain classification is performed on the plurality of training data pairs in the training data set to obtain at least two domain data subsets. Based on each domain data subset, at least two candidate optimization targets for the domain data subset are determined, and at least two candidate single domain models corresponding to each domain data subset are trained based on the at least two candidate optimization targets, respectively. For each domain data subset, the at least two candidate single domain models corresponding to the domain data subset are tested separately, and a candidate optimization target corresponding to one of the candidate single domain models with the highest test accuracy is selected as a designated optimization target for the domain data subset. A hybrid domain model is trained based on each domain data subset in the training data set and the designated optimization target corresponding to each domain data subset. In this way, different optimization targets are set for language data in different domains and training is performed to obtain machine translation models, which improves the quality of translation results of the machine translation models for language data in various domains.

Figure 2:
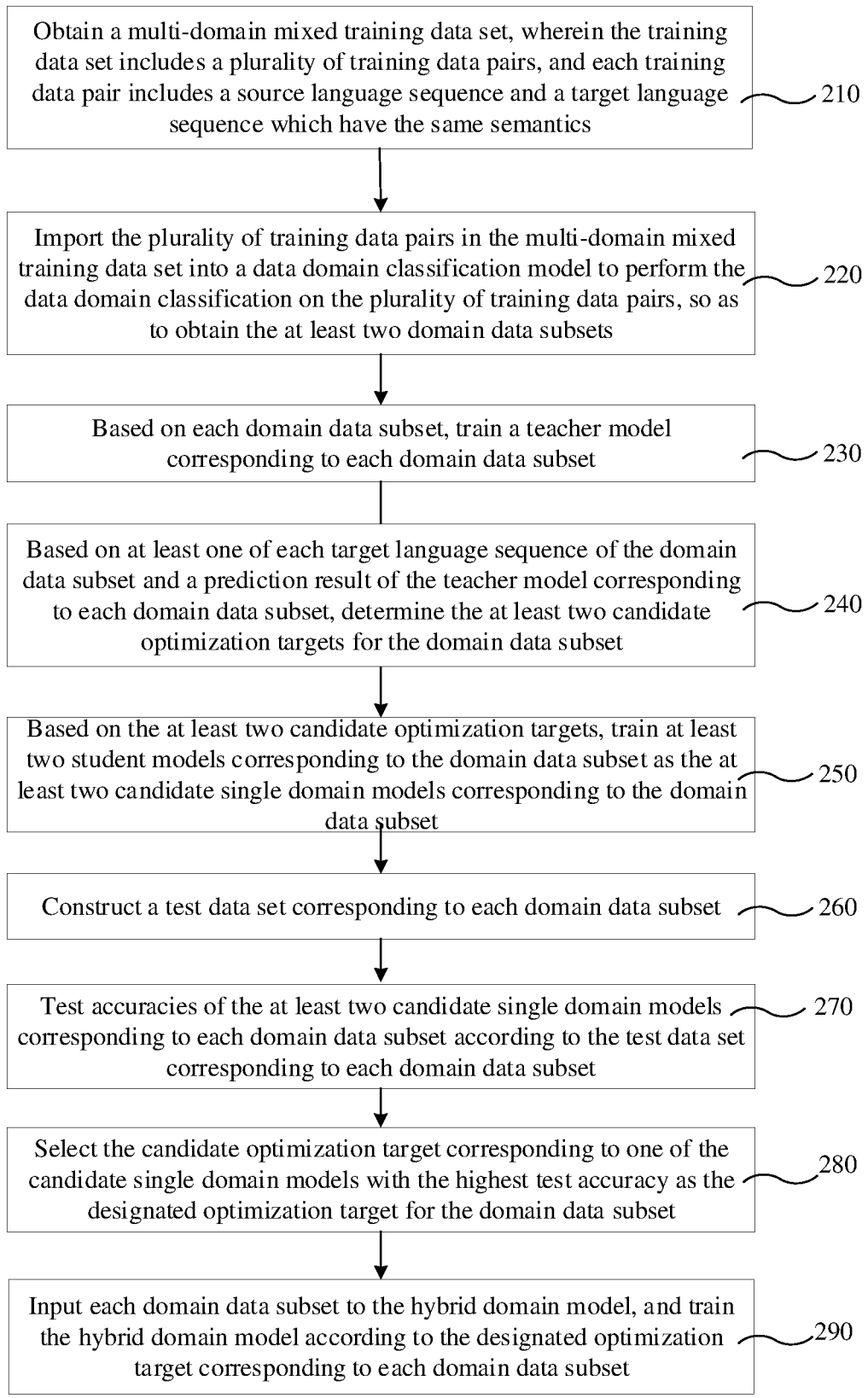
FIG. 2 shows a flowchart of a training method for a machine translation model according to an exemplary embodiment of the present disclosure.

FIG. 2 shows a flowchart of a training method for a machine translation model according to an exemplary embodiment of the present disclosure. The method can be executed by a computer device. As shown in FIG. 2, the training method for the machine translation model includes the following steps.

In step 210, a multi-domain mixed training data set is obtained. The training data set includes a plurality of training data pairs, and each training data pair includes a source language sequence and a target language sequence which have the same semantics.

In step 220, the plurality of training data pairs in the multi-domain mixed training data set are imported into a data domain classification model to perform the data domain classification on the plurality of training data pairs, so as to obtain the at least two domain data subsets. Each domain data subset includes at least one training data pair.

In an embodiment, classification can be simply performed according to rules, for example, classification can be performed according to the length of a language sequence. It is assumed that a set of multi-domain mixed training data pairs are divided into two domains: news and oral expression. Since the language sequence in the news domain is generally longer than the language sequence in the oral expression domain, a length threshold for the language sequence can be set, and the training data pair where the language sequence is larger than the length threshold is classified as the news domain, and the training data pair where the language sequence is smaller than the length threshold is classified as the oral expression domain.

The above method can classify data domains in a simple way. For data domain classification with high requirements, a data domain classification model can be used.

Figure 3:
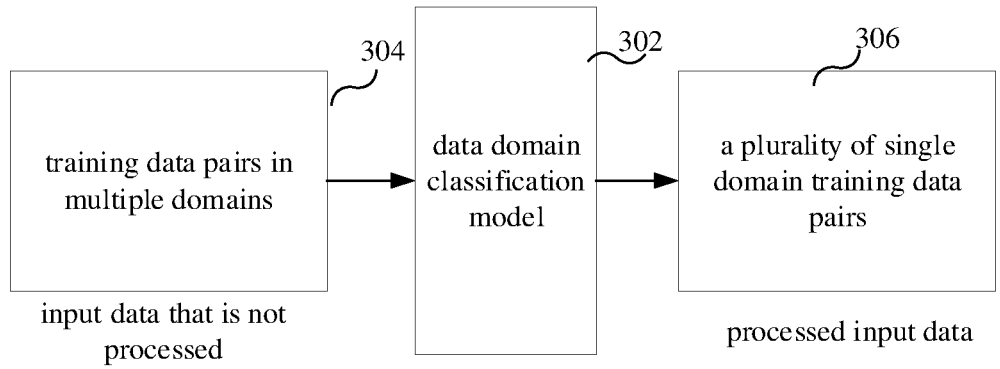
FIG. 3 shows a schematic diagram of classification by a data domain classification model according to an exemplary embodiment of the present disclosure.

The data domain classification model is obtained through training of multiple training data pairs. FIG. 3 shows a schematic diagram of classification by a data domain classification model according to an exemplary embodiment of the present disclosure. As shown in FIG. 3, a data domain classification model 302 can divide multi-domain mixed data pairs 304 input into the model 302, into a plurality of domain data subsets 306 in multiple domains.

In an embodiment, the data domain classification model outputs data domain classification results by adopting the data domain classification method illustrated in FIG. 1, that is, setting marks corresponding to various domains on data pairs in different domains. For example, for a training data pair (X, Y) belonging to data domain A, the source language sequence is $X=[x_1, x_2, \ldots, x_n]$, and the target language sequence is $Y=[y_1, y_2, \ldots, y_m]$. A mark A corresponding to the data domain A can be set. The mark A can be a specified symbol, for example, when the mark A is a parenthesis, after adding the mark A to the training data pair (X, Y) in the data domain A, the training data pair becomes: $(X=[x_1, x_2, \ldots, x_n], Y=[y_1, y_2, \ldots, y_m])$. For the training data pair in the data domain B, a mark B corresponding to the data domain B can be added. In this way, the data domain classification of the multi-domain mixed training data pair can be realized.

It should be noted that the above methods of classifying the data domains of the multi-domain mixed training data pairs are only exemplary, and the present disclosure does not impose specific limitations on the data domain classification method of the multi-domain mixed training data pairs.

In step 230, based on each domain data subset, a teacher model corresponding to each domain data subset is trained.

Teacher model is a concept in knowledge distillation. In knowledge distillation, when a teacher model guides a student model, the probability of each word obtained by the teacher model in decoding is used as an optimization target to guide the student model, that is, the soft-target is used to guide the student model. This method can make full use of the probability of the teacher model on other error words to guide the student model to pass more information to the student model and reduce the difficulty in the target optimization.

In an embodiment, in order to obtain the predicted probability distribution of the teacher model, that is, the soft-target, the teacher model corresponding to the domain data subset is trained based on each domain data subset.

In an embodiment, the teacher model corresponding to each domain data subset may be trained with the real probability distribution of each target language sequence included in the domain data subset as an optimization target.

For example, the source language sequence is "我爱你" and the target language sequence is "I love you". There are three words in the word list: I, love, and you. The real probability distribution of the target language sequence is represented as a set Y. When predicting the source language sequence "我爱你", in the real probability, the probability of translating "我" into "I" is 1, and the probability of translating "我" into "love" or "you" is 0, then the true probability distribution of the prediction result of "我" in the source language sequence on the word list is [1, 0, 0]. Accordingly, the true probability distribution [1, 0, 0] of the prediction result of "我" in the source language sequence on the word list is used as the optimization target to train the teacher model to obtain a corresponding teacher model.

For the teacher model obtained by using the real probability distribution of the target language sequence as the optimization target, the result is predicted by outputting the probability of each word on the word list, and the one with the highest probability is selected as the translation result of the word. For example, when translating the same source language sequence "我爱你" on the word list, the probability distribution of the prediction result obtained by the teacher model for "我" is [0.9, 0.1, 0] on the word list. That is, the prediction result of the teacher model is as follows: the probability of translating "我" into "I" is 0.9, the probability of translating "我" into "love" is 0.1, and the probability of translating "我" into "you" is 0. Finally, the teacher model will choose the one with the highest probability as the translation result of "我", that is, "我" is translated into "I", and [0.9, 0.1, 0] in the above example is the predicted result of the teacher model.

In step 240, based on at least one of each target language sequence of the domain data subset and a prediction result of the teacher model corresponding to each domain data subset, the at least two candidate optimization targets for the domain data subset are determined.

According to an embodiment, for each domain data subset, an optimization objective function is constructed:

$$Z = pT(X) + (1-p)Y,$$

where T(X) is a predicted probability distribution output by the teacher model corresponding to the domain data subset, Y is a true probability distribution of each target language sequence included in the domain data subset, and p is a domain weight and satisfies $0 \leq p \leq 1$.

At least two values of the domain weight p are selected, and the at least two candidate optimization targets for the domain data subset are obtained based on the optimization objective function.

The domain weight p refers to the weight of the prediction result output by the teacher model in the optimization objective function. When p=0, the optimization objective function Z=Y, that is, the candidate optimization target of the domain data subset is the true probability distribution of each target language sequence included in the domain data subset. When p=1, the optimization objective function is Z=T (X), that is, the candidate optimization target of the domain data subset is the predicted probability distribution output by the teacher model corresponding to the domain data subset. When 0<p<1, Z==pT(X)+(1−p)Y, that is, the candidate optimization target of the domain data subset is a weighted result of the predicted probability distribution output by the teacher model corresponding to the domain data subset and the true probability distribution of each target language sequence contained in the domain data subset.

For example, the source language sequence is "我爱你" and the target language sequence is "I love you", and there are three words in the word list: I, love and you. From the above translation of "我", we can know that the true probability distribution of the prediction result of "我" in the source language sequence on the word list is [1, 0, 0], and the predicted probability distribution output by the teacher model output on the word list is [0.9, 0.1, 0]. When p=0, it is determined that the optimization target for "我" is the true probability distribution [1, 0, 0] on the word list. When p=1, it is determined that the optimization target for "我" is the predicted probability distribution [0.9, 0.1, 0] output by the teacher model on the word list. When 0<p<1, if p=0.5, then the optimization target for "我" is:

$$Z = 0.5*[1,0,0] + 0.5*[0.9,0.1,0] = [0.95, 0.05, 0]$$

In other words, the optimization target for "我" is the probability distribution [0.95, 0.05, 0] on the word list.

In step 250, based on the at least two candidate optimization targets, at least two student models corresponding to the domain data subset are trained as the at least two candidate single domain models corresponding to the domain data subset.

Figure 4:
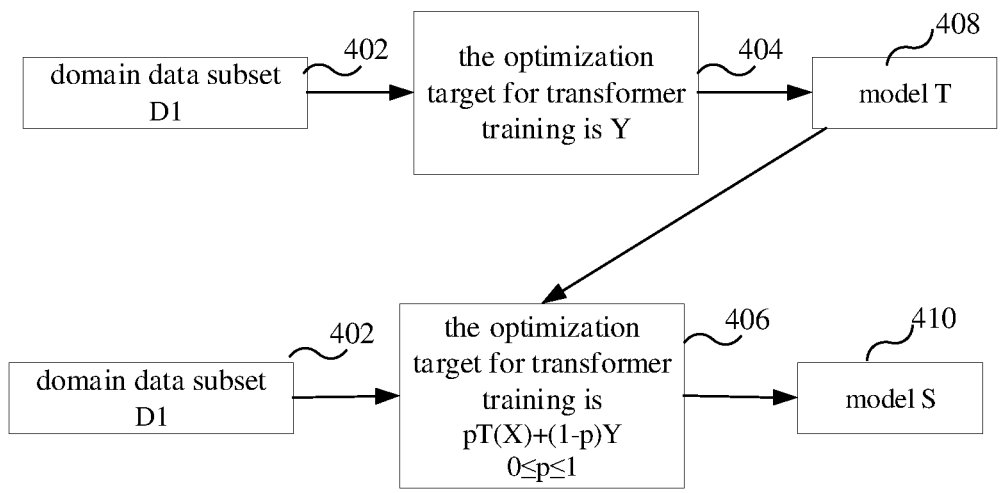
FIG. 4 shows a schematic diagram of training a single domain model based on different optimization targets according to an exemplary embodiment of the present disclosure.

FIG. 4 shows a schematic diagram of training a single domain model based on different optimization targets according to an exemplary embodiment of the present disclosure. As shown in FIG. 4, the same domain data subset 402 is trained with different optimization targets 404 and 406 to obtain corresponding candidate single domain models 408 and 410, respectively. For example, the domain data subset D1 in FIG. 4 can be trained with the optimization target Y to obtain the candidate single domain model T. Training can be performed by using the calculation result of the constructed optimization objective function Z=pT(X)+(1−p)Y as the optimization target to obtain a candidate single domain model S, where $0 \leq p \leq 1$. When p=0, the optimization objective function is Z=Y, that is, training is performed with the optimization target T to obtain the candidate single domain model S, which corresponds to the candidate single domain model T. When p=1, the optimization objective function is Z=T (X), that is, training is performed by using the prediction result T(X) of the candidate single domain model T as the optimization target to obtain the candidate single-domain model S.

In step 260, a test data set corresponding to each domain data subset is constructed.

The test data set corresponding to each domain data subset can be composed of all or part of the training data pairs in the training data set. Alternatively, multiple test data pairs can be obtained again, and each test data pair includes a source language sequence and a target language sequence with the same semantics to constitute a test data set corresponding to each domain data subset.

In step 270, accuracies of the at least two candidate single domain models corresponding to each domain data subset are tested according to the test data set corresponding to each domain data subset.

During the testing procedure, the source language sequence in the test data set corresponding to each domain data subset can be output to each single domain model to obtain the prediction results of each single domain model. According to the prediction results, the translation results of each single domain model can be obtained. The accuracies of the translation results of each single domain model are determined according to the target language sequence in the test data set.

In step 280, the candidate optimization target corresponding to one of the candidate single domain models with the highest test accuracy is selected as the designated optimization target for the domain data subset.

In step 290, each domain data subset is input to the hybrid domain model, and the hybrid domain model is trained according to the designated optimization target corresponding to each domain data subset.

Figure 5:
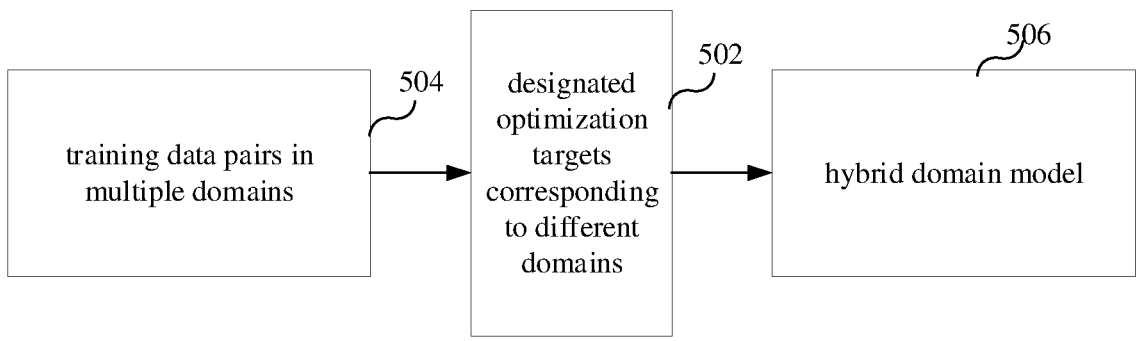
FIG. 5 shows a schematic diagram of training a hybrid domain model according to an exemplary embodiment of the present disclosure.

FIG. 5 shows a schematic diagram of training of a hybrid domain model according to an exemplary embodiment of the present disclosure. For example, each domain data subset is input to the hybrid domain model to train the training data pairs in each domain. As shown in FIG. 5, training data pairs 504 in different domains are trained according to a corresponding designated optimization target 502. That is, during the training procedure, the parameters of a hybrid domain model 506 are adjusted through different designated optimization targets, so that the finally obtained hybrid domain training model performs well in various data domains.

In the training methods for the machine translation model according to embodiments of the present disclosure, a multi-domain mixed training data set is obtained, and data domain classification is performed on the plurality of training data pairs in the training data set to obtain at least two domain data subsets. Based on each domain data subset, at least two candidate optimization targets for the domain data subset are determined, and at least two candidate single domain models corresponding to each domain data subset are trained based on the at least two candidate optimization targets, respectively. For each domain data subset, the at least two candidate single domain models corresponding to the domain data subset are tested separately, and a candidate optimization target corresponding to one of the candidate single domain models with the highest test accuracy is selected as a designated optimization target for the domain data subset. A hybrid domain model is trained based on each domain data subset in the training data set and the designated optimization target corresponding to each domain data subset. In this way, different optimization targets are set for language data in different domains and training is performed to obtain machine translation models, which improves the quality of translation results of the machine translation models for language data in various domains.

Figure 6:
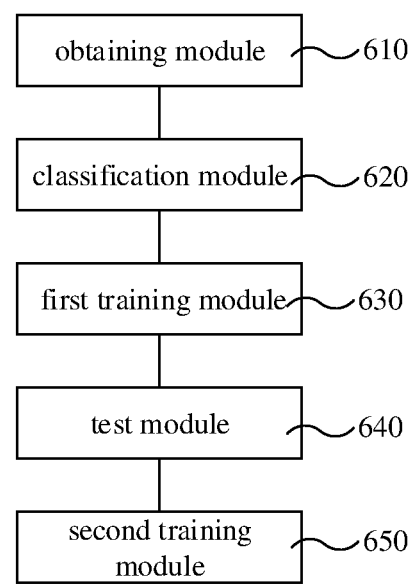
FIG. 6 is a block diagram of a machine translation model training device according to an exemplary embodiment.

FIG. 6 is a block diagram of a machine translation model training device according to an exemplary embodiment. The machine translation model training device is applied to a computer device to perform all or part of the steps of the methods shown in any one of the foregoing embodiments described with reference to FIG. 1 or 2. As shown in FIG. 6, the machine translation model training device can include an obtaining module 610, a classification module 620, a first training module 630, a test module 640, and a second training module 650.

The obtaining module 610 is configured to obtain a multi-domain mixed training data set, wherein the training data set includes a plurality of training data pairs, and each training data pair includes a source language sequence and a target language sequence which have the same semantics.

The classification module 620 is configured to perform data domain classification on the plurality of training data pairs in the training data set to obtain at least two domain data subsets. Each domain data subset corresponds to one data domain.

The first training module 630 is configured to, based on each domain data subset, determine at least two candidate optimization targets for the domain data subset, and train at least two candidate single domain models corresponding to each domain data subset based on the at least two candidate optimization targets, respectively.

The test module 640 is configured to, for each domain data subset, test the at least two candidate single domain models corresponding to the domain data subset separately, and select a candidate optimization target corresponding to one of the candidate single domain models with the highest test accuracy as a designated optimization target for the domain data subset.

The second training module 650 is configured to train a hybrid domain model based on each domain data subset in the training data set and the designated optimization target corresponding to each domain data subset.

In an embodiment, the first training module 630 includes: a first training model submodule configured to, based on each domain data subset, train a teacher model corresponding to each domain data subset; a determination submodule configured to, based on at least one of each target language sequence of the domain data subset and a prediction result of the teacher model corresponding to each domain data subset, determine the at least two candidate optimization targets for the domain data subset; and a second training submodule configured to, based on the at least two candidate optimization targets, train at least two student models corresponding to the domain data subset as the at least two candidate single domain models corresponding to the domain data subset.

In an embodiment, the determination submodule is configured to: for each domain data subset, construct an optimization objective function: $pT(X)+(1-p)Y$, where $T(X)$ is a predicted probability distribution outputted by the teacher model corresponding to the domain data subset, $Y$ is a true probability distribution of each target language sequence included in the domain data subset, and $p$ is a domain weight and satisfies $0 \leq p \leq 1$; and select at least two values of the domain weight $p$, and obtain the at least two candidate optimization targets for the domain data subset based on the optimization objective function.

In an embodiment, the classification module 620 is configured to: import the plurality of training data pairs in the multi-domain mixed training data set into a data domain classification model to perform the data domain classification on the plurality of training data pairs, so as to obtain the at least two domain data subsets, wherein each domain data subset includes at least one training data pair.

In an embodiment, the first training submodule is configured to: with a true probability distribution of each target language sequence included in each domain data subset as an optimization target, training the teacher model corresponding to the domain data subset.

In an embodiment, the test module 640 includes: a constructing submodule configured to construct a test data set corresponding to each domain data subset; a test submodule configured to test accuracies of the at least two candidate single domain models corresponding to each domain data subset according to the test data set corresponding to each domain data subset; and a selection submodule configured to select the candidate optimization target corresponding to one of the candidate single domain models with the highest test accuracy as the designated optimization target for the domain data subset.

In an embodiment, the second training module 650 is configured to: input each domain data subset to the hybrid domain model, and train the hybrid domain model according to the designated optimization target corresponding to each domain data subset.

The machine translation model training device according to embodiments of the present disclosure can be applied in a computer device. A multi-domain mixed training data set is obtained, and data domain classification is performed on the plurality of training data pairs in the training data set to obtain at least two domain data subsets. Based on each domain data subset, at least two candidate optimization targets for the domain data subset are determined, and at least two candidate single domain models corresponding to each domain data subset are trained based on the at least two candidate optimization targets, respectively. For each domain data subset, the at least two candidate single domain models corresponding to the domain data subset are tested separately, and a candidate optimization target corresponding to one of the candidate single domain models with the highest test accuracy is selected as a designated optimization target for the domain data subset. A hybrid domain model is trained based on each domain data subset in the training data set and the designated optimization target corresponding to each domain data subset. In this way, different optimization targets are set for language data in different domains and training is performed to obtain machine translation models, which improves the quality of translation results of the machine translation models for language data in various domains.

An exemplary embodiment of the present disclosure provides a machine translation model training device, which can be applied to a computer device to implement all or part of the steps of the methods shown in any one of the embodiments of the present disclosure described with reference to FIG. 1 or 2. The machine translation model training device may include a processor and a memory for storing instructions executable by the processor. The processor is configured to: obtain a multi-domain mixed training data set, wherein the training data set includes a plurality of training data pairs, and each training data pair includes a source language sequence and a target language sequence which have the same semantics; perform data domain classification on the plurality of training data pairs in the training data set to obtain at least two domain data subsets, wherein each domain data subset corresponds to one data domain; based on each domain data subset, determine at least two candidate optimization targets for the domain data subset, and train at least two candidate single domain models corresponding to each domain data subset based on the at least two candidate optimization targets, respectively; for each domain data subset, test the at least two candidate single domain models corresponding to the domain data subset separately, and select a candidate optimization target corresponding to one of the candidate single domain models with the highest test accuracy as a designated optimization target for the domain data subset; and train a hybrid domain model based on each domain data subset in the training data set and the designated optimization target corresponding to each domain data subset.

In an embodiment, based on each domain data subset, determining at least two candidate optimization targets for the domain data subset, and training at least two candidate single domain models corresponding to each domain data subset based on the at least two candidate optimization targets, respectively, includes: based on each domain data subset, training a teacher model corresponding to each domain data subset; based on at least one of each target language sequence of the domain data subset and a prediction result of the teacher model corresponding to each domain data subset, determining the at least two candidate optimization targets for the domain data subset; and based on the at least two candidate optimization targets, training at least two student models corresponding to the domain data subset as the at least two candidate single domain models corresponding to the domain data subset.

In an embodiment, based on at least one of each target language sequence of the domain data subset and a prediction result of the teacher model corresponding to each domain data subset, determining the at least two candidate optimization targets for the domain data subset includes: for each domain data subset, constructing an optimization objective function: $pT(X)+(1-p)Y$, where $T(X)$ is a predicted probability distribution outputted by the teacher model corresponding to the domain data subset, $Y$ is a true probability distribution of each target language sequence included in the domain data subset, and $p$ is a domain weight and satisfies $0 \leq p \leq 1$; and selecting at least two values of the domain weight $p$, and obtaining the at least two candidate optimization targets for the domain data subset based on the optimization objective function.

In an embodiment, performing data domain classification on the plurality of training data pairs in the training data set to obtain at least two domain data subsets, includes: importing the plurality of training data pairs in the multi-domain mixed training data set into a data domain classification model to perform the data domain classification on the plurality of training data pairs, so as to obtain the at least two domain data subsets, wherein each domain data subset includes at least one training data pair.

In an embodiment, based on each domain data subset, training a teacher model corresponding to each domain data subset, includes: with a true probability distribution of each target language sequence included in each domain data subset as an optimization target, training the teacher model corresponding to the domain data subset.

In an embodiment, for each domain data subset, testing the at least two candidate single domain models corresponding to the domain data subset separately, and selecting a candidate optimization target corresponding to one of the candidate single domain models with the highest test accuracy as a designated optimization target for the domain data subset, includes: constructing a test data set corresponding to each domain data subset; testing accuracies of the at least two candidate single domain models corresponding to each domain data subset according to the test data set corresponding to each domain data subset; and selecting the candidate optimization target corresponding to one of the candidate single domain models with the highest test accuracy as the designated optimization target for the domain data subset.

In an embodiment, training a hybrid domain model based on each domain data subset in the training data set and the designated optimization target corresponding to each domain data subset, includes: inputting each domain data subset to the hybrid domain model, and training the hybrid domain model according to the designated optimization target corresponding to each domain data subset.

The machine translation model training device according to embodiments of the present disclosure can be applied in a computer device. A multi-domain mixed training data set is obtained, and data domain classification is performed on the plurality of training data pairs in the training data set to obtain at least two domain data subsets. Based on each domain data subset, at least two candidate optimization targets for the domain data subset are determined, and at least two candidate single domain models corresponding to each domain data subset are trained based on the at least two candidate optimization targets, respectively. For each domain data subset, the at least two candidate single domain models corresponding to the domain data subset are tested separately, and a candidate optimization target corresponding to one of the candidate single domain models with the highest test accuracy is selected as a designated optimization target for the domain data subset. A hybrid domain model is trained based on each domain data subset in the training data set and the designated optimization target corresponding to each domain data subset. In this way, different optimization targets are set for language data in different domains and training is performed to obtain machine translation models, which improves the quality of translation results of the machine translation models for language data in various domains.

Figure 7:
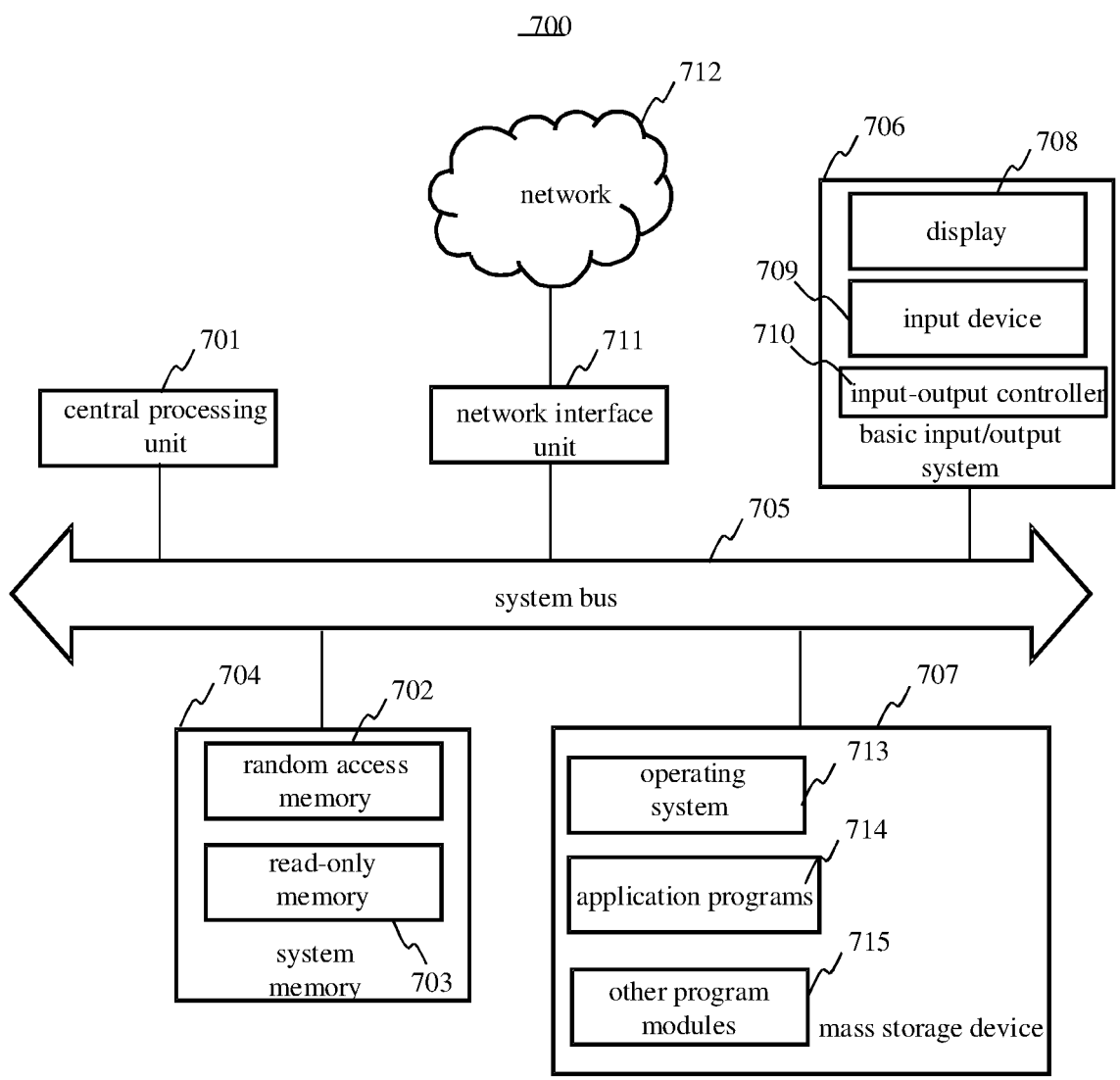
FIG. 7 is a block diagram of a computer device according to an exemplary embodiment.

FIG. 7 is a block diagram of a computer device 700 according to an exemplary embodiment. The computer device 700 may be a computer device capable of training a machine translation model in the above embodiments. The computer device 700 includes a central processing unit (CPU) 701, a system memory 704 including a random access memory (RAM) 702 and a read-only memory (ROM) 703, and a system bus 705 connecting the system memory 704 and the central processing unit 701. The computer device 700 further includes a basic input/output system (I/O system) 706 that helps transfer information between various devices in the computer, and a mass storage device 707 configured to store an operating system 713, application programs 714, and other program modules 715.

The basic input/output system 706 includes a display 708 for displaying information and an input device 709 for a user to input information, such as a mouse, a keyboard, or the like. The display 708 and the input device 709 are both connected to the central processing unit 701 through an input-output controller 710 connected to the system bus 705. The basic input/output system 706 may further include the input/output controller 710 for receiving and processing input from a plurality of other devices such as a keyboard, a mouse, or an electronic stylus. Similarly, the input-output controller 710 also provides output to a display screen, a printer, or other type of output device.

The mass storage device 707 is connected to the central processing unit 701 through a mass storage controller (not shown) connected to the system bus 705. The mass storage device 707 and its associated computer-readable medium provide non-volatile storage for the computer device 700. That is, the mass storage device 707 may include a computer-readable medium (not shown) such as a hard disk or a Compact Disc Read-Only Memory (CD-ROM) drive.

Generally, the computer-readable medium may include a computer storage medium and a communication medium. The computer storage medium includes volatile and non-volatile, or removable and non-removable medium implemented in any method or technology for storage of information such as computer-readable instructions, data structures, program modules or other data. The computer storage medium includes RAM, ROM, Erasable Programmable Read Only Memory (EPROM), Electronically-Erasable Programmable Read-Only Memory (EEPROM), flash memory, or other solid-state storage technologies, such as CD-ROM, Digital versatile disc (DVD) or other optical storage, tape cartridges, magnetic tapes, disk storage or other magnetic storage devices. Those skilled in the art may know that the computer storage medium is not limited to the foregoing. The above-mentioned system memory 704 and the mass storage device 707 may be collectively referred to as a memory.

According to embodiments of the present disclosure, the computer device 700 may also be operated by a remote computer connected to a network through a network such as the Internet. That is, the computer device 700 may be connected to a network 712 through a network interface unit 711 connected to the system bus 705, or the network interface unit 711 may be used to connect to other types of networks or remote computer systems (not shown).

The memory further includes one or more programs, and the one or more programs are stored in the memory. The central processing unit 701 executes the one or more programs to implement all or part of the steps of the methods described with reference to FIG. 1 or 2.

Those skilled in the art should understand that, in one or more of the above examples, the functions described in the embodiments of the present disclosure may be implemented by hardware, software, firmware, or any combination thereof. When implemented in software, the functions may be stored on a computer-readable medium or transmitted as one or more instructions or codes on a computer-readable medium. The computer-readable medium includes a computer storage medium and a communication medium, the communication medium includes any medium that facilitates transfer of a computer program from one place to another. The storage medium can be any available medium that can be accessed by a general purpose or special purpose computer.

An embodiment of the present disclosure further provides a computer-readable storage medium for storing at least one instruction, at least one program, code set or instruction set, the at least one instruction, the at least one program, code set or instruction set is loaded and executed by the processor to implement the above-mentioned training methods for the machine translation model. For example, the computer-readable storage medium may be a ROM, a RAM, a CD-ROM, a magnetic tape, a floppy disk, an optical data storage device, or the like.

Other embodiments will be apparent to those skilled in the art from consideration of the specification and practice of the disclosure here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A training method for a machine translation model, comprising:
obtaining a multi-domain mixed training data set, wherein the training data set comprises a plurality of training data pairs, and each training data pair comprises a source language sequence and a target language sequence having a same semantics;
performing data domain classification on the plurality of training data pairs in the training data set to obtain at least two domain data subsets, wherein each domain data subset corresponds to one data domain;
determining, based on each domain data subset, at least two candidate optimization targets for the domain data subset, and training at least two candidate single domain models corresponding to each domain data subset based on the at least two candidate optimization targets, respectively;
for each domain data subset, testing the at least two candidate single domain models corresponding to the domain data subset separately, and selecting a candidate optimization target corresponding to one of the candidate single domain models with a highest test accuracy as a designated optimization target for the domain data subset; and
training a hybrid domain model based on each domain data subset in the training data set and the designated optimization target corresponding to each domain data subset;
wherein, based on each domain data subset, determining the at least two candidate optimization targets for the domain data subset, and training the at least two candidate single domain models corresponding to each domain data subset based on the at least two candidate optimization targets, respectively, comprises:
based on each domain data subset, training a teacher model corresponding to each domain data subset;
based on at least one of each target language sequence of the domain data subset and a prediction result of the teacher model corresponding to each domain data subset, determining the at least two candidate optimization targets for the domain data subset; and
based on the at least two candidate optimization targets, training at least two student models corresponding to the domain data subset as the at least two candidate single domain models corresponding to the domain data subset;
wherein, based on the at least one of each target language sequence of the domain data subset and the prediction result of the teacher model corresponding to each domain data subset, determining the at least two candidate optimization targets for the domain data subset comprises:
for each domain data subset, constructing an optimization objective function: $pT(X)+(1-p)Y$, where $T(X)$ is a predicted probability distribution output by the teacher model corresponding to the domain data subset, Y is a true probability distribution of each target language sequence comprised in the domain data subset, and p is a domain weight and satisfies $0 \le p \le 1$; and
selecting at least two values of the domain weight p, and obtaining the at least two candidate optimization targets for the domain data subset based on the optimization objective function.

2. The method according to claim 1, wherein performing the data domain classification on the plurality of training data pairs in the training data set to obtain the at least two domain data subsets, comprises:
importing the plurality of training data pairs in the multi-domain mixed training data set into a data domain classification model to perform the data domain classification on the plurality of training data pairs, so as to obtain the at least two domain data subsets, wherein each domain data subset comprises at least one training data pair.

3. The method according to claim 1, wherein based on each domain data subset, training the teacher model corresponding to each domain data subset, comprises:
with a true probability distribution of each target language sequence comprised in each domain data subset as an optimization target, training the teacher model corresponding to the domain data subset.

4. The method according to claim 1, wherein for each domain data subset, testing the at least two candidate single domain models corresponding to the domain data subset separately, and selecting the candidate optimization target corresponding to one of the candidate single domain models with the highest test accuracy as the designated optimization target for the domain data subset, comprises:
constructing a test data set corresponding to each domain data subset;
testing accuracies of the at least two candidate single domain models corresponding to each domain data subset according to the test data set corresponding to each domain data subset; and
selecting the candidate optimization target corresponding to one of the candidate single domain models with the highest test accuracy as the designated optimization target for the domain data subset.

5. The method according to claim 1, wherein training the hybrid domain model based on each domain data subset in the training data set and the designated optimization target corresponding to each domain data subset, comprises:
inputting each domain data subset to the hybrid domain model, and training the hybrid domain model according to the designated optimization target corresponding to each domain data subset.

6. A training device for a machine translation model, comprising:
a processor; and
a memory storing instructions executable by the processor,
wherein the processor is configured to:
obtain a multi-domain mixed training data set, wherein the training data set comprises a plurality of training data pairs, and each training data pair comprises a source language sequence and a target language sequence having a same semantics;
perform data domain classification on the plurality of training data pairs in the training data set to obtain at least two domain data subsets, wherein each domain data subset corresponds to one data domain;
based on each domain data subset, determine at least two candidate optimization targets for the domain data subset, and train at least two candidate single domain models corresponding to each domain data subset based on the at least two candidate optimization targets, respectively;

for each domain data subset, test the at least two candidate single domain models corresponding to the domain data subset separately, and select a candidate optimization target corresponding to one of the candidate single domain models with a highest test accuracy as a designated optimization target for the domain data subset; and train a hybrid domain model based on each domain data subset in the training data set and the designated optimization target corresponding to each domain data subset;

wherein the processor is further configured to:

based on each domain data subset, train a teacher model corresponding to each domain data subset;

based on at least one of each target language sequence of the domain data subset and a prediction result of the teacher model corresponding to each domain data subset, determine the at least two candidate optimization targets for the domain data subset; and based on the at least two candidate optimization targets, train at least two student models corresponding to the domain data subset as the at least two candidate single domain models corresponding to the domain data subset;

wherein the processor is further configured to:

for each domain data subset, construct an optimization objective function: $pT(X)+(1-p)Y$, where $T(X)$ is a predicted probability distribution output by the teacher model corresponding to the domain data subset, Y is a true probability distribution of each target language sequence comprised in the domain data subset, and p is a domain weight and satisfies $0 \leq p \leq 1$; and select at least two values of the domain weight p, and obtain the at least two candidate optimization targets for the domain data subset based on the optimization objective function.

7. The device according to claim 6, wherein the processor is further configured to:

import the plurality of training data pairs in the multi-domain mixed training data set into a data domain classification model to perform the data domain classification on the plurality of training data pairs, so as to obtain the at least two domain data subsets, wherein each domain data subset comprises at least one training data pair.

8. The device according to claim 6, wherein the processor is further configured to:

with a true probability distribution of each target language sequence comprised in each domain data subset as an optimization target, train the teacher model corresponding to the domain data subset.

9. The device according to claim 6, wherein the processor is further configured to:

construct a test data set corresponding to each domain data subset;

test accuracies of the at least two candidate single domain models corresponding to each domain data subset according to the test data set corresponding to each domain data subset; and select the candidate optimization target corresponding to one of the candidate single domain models with the highest test accuracy as the designated optimization target for the domain data subset.

10. The device according to claim 6, wherein the processor is further configured to:

input each domain data subset to the hybrid domain model, and train the hybrid domain model according to the designated optimization target corresponding to each domain data subset.

11. A non-transitory computer-readable storage medium having stored therein instructions that, when executed by a processor of a computer device, cause the computer device to perform a training method for a machine translation model, the method comprising:

obtaining a multi-domain mixed training data set, wherein the training data set comprises a plurality of training data pairs, and each training data pair comprises a source language sequence and a target language sequence having a same semantics;

performing data domain classification on the plurality of training data pairs in the training data set to obtain at least two domain data subsets, wherein each domain data subset corresponds to one data domain;

determining, based on each domain data subset, at least two candidate optimization targets for the domain data subset, and training at least two candidate single domain models corresponding to each domain data subset based on the at least two candidate optimization targets, respectively;

for each domain data subset, testing the at least two candidate single domain models corresponding to the domain data subset separately, and selecting a candidate optimization target corresponding to one of the candidate single domain models with a highest test accuracy as a designated optimization target for the domain data subset; and training a hybrid domain model based on each domain data subset in the training data set and the designated optimization target corresponding to each domain data subset;

wherein, based on each domain data subset, determining the at least two candidate optimization targets for the domain data subset, and training the at least two candidate single domain models corresponding to each domain data subset based on the at least two candidate optimization targets, respectively, comprises:

based on each domain data subset, training a teacher model corresponding to each domain data subset;

based on at least one of each target language sequence of the domain data subset and a prediction result of the teacher model corresponding to each domain data subset, determining the at least two candidate optimization targets for the domain data subset; and based on the at least two candidate optimization targets, training at least two student models corresponding to the domain data subset as the at least two candidate single domain models corresponding to the domain data subset;

wherein, based on at least one of each target language sequence of the domain data subset and the prediction result of the teacher model corresponding to each domain data subset, determining the at least two candidate optimization targets for the domain data subset comprises:

for each domain data subset, constructing an optimization objective function: $pT(X)+(1-p)Y$, where $T(X)$ is a predicted probability distribution output by the teacher model corresponding to the domain data subset, Y is a true probability distribution of each target language sequence comprised in the domain data subset, and p is a domain weight and satisfies 0≤p≤1; and selecting at least two values of the domain weight p, and obtaining the at least two candidate optimization targets for the domain data subset based on the optimization objective function.

* * * * *